United States Patent

Shishoo et al.

[11] 4,036,924
[45] July 19, 1977

[54] PROCESS AND DEVICE FOR MOLDING TEXTILE MATERIALS

[75] Inventors: Roshan Lal Shishoo, Askim; Sara Inga-Lill Alfredsson, Kungsbacka, both of Sweden

[73] Assignee: Svenska Textilforskningsinstitutet, Goteborg, Sweden

[21] Appl. No.: 544,996

[22] Filed: Jan. 28, 1975

[30] Foreign Application Priority Data

Feb. 14, 1974 Sweden .............................. 7401961

[51] Int. Cl.² .............................................. B29C 17/04
[52] U.S. Cl. .................................... 264/89; 28/100; 264/92; 264/234; 264/291; 264/342 R; 264/345; 264/DIG. 73; 264/DIG. 78
[58] Field of Search ............................... 264/234–235, 264/89, 291–292, 345–346, 348, 92, DIG. 73, DIG. 78; 28/71.3, 72.3

[56] References Cited

U.S. PATENT DOCUMENTS

| | | | |
|---|---|---|---|
| 1,214,846 | 2/1917 | Tracy | 264/292 |
| 2,924,852 | 2/1960 | Michalko | 264/292 |
| 3,008,613 | 11/1961 | Paris | 223/57 X |
| 3,331,906 | 7/1967 | Adams | 264/292 |
| 3,332,587 | 7/1967 | Shigihara | 223/52 |
| 3,442,996 | 5/1969 | Fisher | 264/92 |
| 3,549,743 | 12/1970 | Riordon | 264/346 |

*Primary Examiner*—Jeffery R. Thurlow
*Attorney, Agent, or Firm*—Pollock, Vande Sande & Priddy

[57] ABSTRACT

A textile material is molded by preheating to its transition temperature and then rapidly deformed by stretching without cooling. The deformation is maintained for a certain time at the preheating temperature or higher. The material is then quickly cooled. An apparatus for molding particularly fabric has a heat chamber having an opening over which the fabric is fastened, and a molding body having the desired shape and movable towards the heat chamber so as to stretch the fabric while entering partly through the opening. The molding body and heat chamber can be heated and the heat chamber may be evacuated or supplied with air under pressure for cooling the fabric.

21 Claims, 1 Drawing Figure

U.S. Patent
July 19, 1977
4,036,924
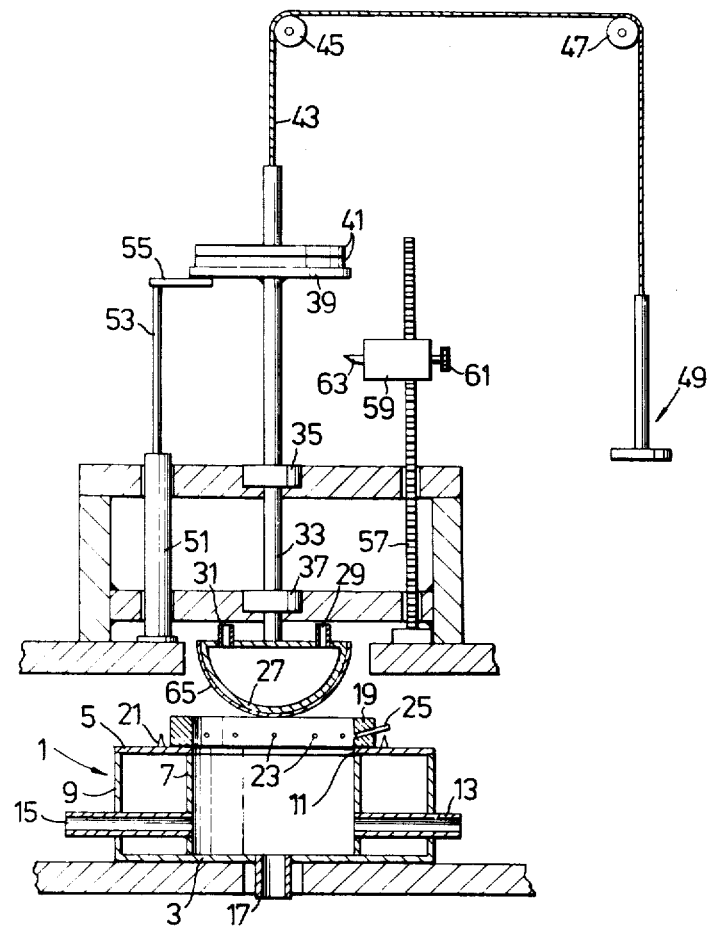

PROCESS AND DEVICE FOR MOLDING TEXTILE MATERIALS

The present invention relates to a process for molding textile materials. An object of the invention is the task of developing a practicable method for giving textile materials permanent deformation. The method or the invention is especially suitable for molding cloth, suitable for use in the manufacture of clothing, but the invention is also applicable to the molding of yarn for fibres, e.g., to introduce crimp into yarn. Earlier known methods for forming textile materials, especially wool, have had the disadvantage that the deformation introduced in molding has not been permanent. Furthermore, greater load and longer pressing time have been required to effect the desired deformation.

These inconveniences are removed according to the invention by a processing method in which the material is preheated to a temperature causing a transition in the material, the material is exposed thereafter, without cooling, to molding deformation by stretching, using a molding body, and the deformation is maintained during a post-heating period at the same or at a higher temperature.

Textile material treated in this way has been found to retain the deformation given to it, even during use and laundering occurring over a lengthy period.

The temperature to which the material shall be heated is dependent on the kind of material, but can be defined as a temperature at which a transition takes place in the material, the amorphous part of the material going from a rigid unordered phase to an elastic one because of increased mobility of the molecule segments. As an example it can be mentioned that certain synthetic materials have a comparatively low transition temperature of about 40–50° C, while wool has a transition at a temperature of about 70° C. Preheating the material is suitably carried out by treating with a gaseous medium at a temperature of at least 70° C, suitably steam at atmospheric pressure. Preheating is carried out for a period of between 5 and 60 seconds, the best result being obtained with durations between 10 and 30 seconds. This is especially applicable to the treatment of wool with steam at atmospheric pressure.

It has been found advantageous to carry out the deformation movement rapidly. Stretching is therefore carried out for at most 5 seconds, preferably for a maximum of 1 second. The deformation movement should be carried out without the textile material having cooled noticeably. Under no circumstances must the temperature of the material fall below the transition temperature.

Post-heating is carried out at at least the same, or preferably a higher temperature, as the one to which the material was heated during preheating. For example, post-heating is carried out within a temperature range of between 60° and 100° C, preferably between 90° and 150° C. Post-heating, and thereby deformation, is maintained for between 5 and 60 seconds, preferably 10 to 40 seconds, using hot air, or, in the case of wool, steam for heating is also applicable to post-heating.

According to a further development of the invention, after post-heating, the material is quickly cooled to a temperature below the preheating temperature, this cooling being carried out without any deforming load on the material. The deformation introduced in the material is made permanent by the quick cooling. To anticipate the reversion of the introduced deformation, which for certain materials can take place under subsequent treatment by laundering and mechanical processing, the material may, according to a further development of the invention, be exposed after cooling to renewed heating and a subsequent second cooling. Such reheating can be carried out with steam at substantially atmospheric pressure and for a period of at most 10 seconds. This applies especially to wool. During reheating and subsequent cooling the best result is obtained if the material is movably suspended and given the possibility of simultaneous mechanical relaxation, e.g., by shaking it or allowing it to flutter, for example.

In one embodiment of the invention for molding a given surface area of a piece of cloth material, the material is clamped in a frame device or its equivalent around the periphery of the surface area which can be hung freely or possibly supported if there are irregularities in the desired configuration of the surface whereafter the material piece is preheated, the frame device and a heated molding body are moved together for stretchingly deforming the material piece, and the molding body is retained in its deforming position during substantially the entire post-heating period. This type of clamping allows deformation to be carried out through stretching, as prescribed according to the invention, and not through press molding between two mold halves. According to a further development of this embodiment, the molding body is removed from the material piece after the post-heating period, whereafter a cooling medium is passed through the material to cool it. The cooling medium can suitably be air at room temperature which is caused to flow through the material for at most 15 seconds, preferably between 5 and 10 seconds.

In a preferred embodiment of the invention, the material piece is brought over a heat treating chamber, preheating and post-heating being carried out by blowing hot air or steam into the chamber and cooling being carried out by the chamber being connected to a negative pressure source, so that cool room air is drawn into the chamber through the material.

The invention also relates to a device for carrying out the process set forth above in molding a given surface area of a material piece. According to the invention, the device includes a frame or its equivalent in which the material piece is clamped around said surface area periphery so that the rest of it is substantially freely movable; heating means adapted to preheat the material piece clamped in the frame device; a heatable molding body; means for moving the molding body and the frame device together so that the molding body deforms the material piece by stretching, and thereafter separating the form body and the frame device; and post-heating means adapted to post-heat the material piece clamped under deformation in the frame device.

Further distinguishing features and advantages of the device according to the invention are set forth below with reference to the accompanying drawing which diagrammatically shows a device for molding pieces of material.

The device comprises a heat treatment chamber 1 made as a box with a bottom 3, a lid 5, an inner wall 7 and an outer wall 9. Lid 5 has an opening 11 the shape of which corresponds to the shape of the surface area of a piece of material intended for deformation. Lid 5 is interchangeable so that lids with openings 11 having other shapes can easily be applied to the heating chamber 1. Inner wall 7 suitably follows the shape of opening 11 and can be interchangeable together with lid 5. Inner wall 7 need not be carefully sealed against bottom 3 of the heating chamber, since this has a sealing outer wall.

The heating chamber is provided with pipe studs 13 and 15, through which the chamber inside inner wall 7 can be supplied with hot air or steam at atmospheric pressure. The heating chamber is further provided with an exhaust pipe stub 17 for connection to a source of negative pressure.

The piece of material which is intended to be molded can be loosely applied directly onto lid 5 of heating chamber 1, and clamped to it with the help of a clamping ring 19 which is shaped to conform with opening 11 in lid 5, and which can be pressed against lid 5 with the help of means not shown so that the material piece is clamped around the periphery of opening 11. To keep the material against lid 5 before clamping ring 19 has been tightened, lid 5 is provided with a number of upstanding pins 21.

Alternatively, the material piece can be placed on a loose frame which can be provided with retaining pins, the frame then being placed on lid 5 of heating chamber 1. With the help of clamping ring 19, the material piece is thereafter clamped either against lid 5 or against the frame, which in such case is provided with an opening corresponding to opening 11.

The inside surface of clamping ring 19 is provided with a number of openings 23 leading to a hose connection 25 for communicating with negative pressure source. Steam rising from heating chamber 1 through the piece of material is evacuated through these openings 23, thereby preventing condensation of steam on clamping ring 19 and drops of water damping the material.

The molding body of the molding device is shown for the sake of simplicity on the drawing as a hollow hemisphere 27 and provide with pipe studs 29, 31 for the supply and exhaust of hot air or other heating medium. The molding body 27 is suspended in a vertical rod 33 slidably guided in bearings 35 and 37, and provided adjacent to its upper end with a horizontal plate 39. Weights 41 on plate 39 can be mounted as desired. The upper end of rod 33 is connected with a rope 43 running over rope pulleys 45, 47 and attached at its other end to a counterweight carrier 49 on which counterweights (not shown) can be placed for the case where it is desired to adjust the bearing force of molding body 27 to a value lower than the weight of molding body 27 with rod 33 and plate 39.

The drawing shows molding body 27 raised to a first starting position with the help of a penumatic cylinder 51, the piston rod 53 of which engages under weight plate 39 with the help of a horizontal arm 55. In its lower position the arm 55 lies lower than the lowest level plate 39 can assume during operation. A releasable stop 59 is arranged on a vertical rack 57, movable upwards and downwards with the help of a pinion (not shown) operated by a wheel 61. Stop 59 includes a boss 63 which, in the position shown in the drawing, is in the path of movement of plate 39 of the molding body. By means of an electromagnet (not shown) stop boss 63 can be withdrawn so that plate 39 can pass by stop 69.

The molding body is suitably provided on its working surface with a friction reducing surface coating 65, e.g., plastic with the trade name "Teflon".

As an alternative to the arrangement shown on the drawing for operating molding body 27, it is possible to utilize a pneumatic or hydraulic piston cylinder arrangement to effect mutual movement between molding body 27 and heating chamber 1. In such case, provision should be made for the rapid movement of molding body 27 this being essential for achieving good results. As stated hereinabove, the total deformation movement should be carried out during 5 seconds at most, but preferably in less than 1 second.

The embodiment of the device described above and shown in the drawing can be utilized in the following way.

A piece of cloth material is placed on a frame or directly on the lid 5 of heating chamber 1 and is clamped by clamping ring 19. Piston rod 53 is lowered, plate 39 accompanying the lowering movement until it is carried by the boss 63 of stop 59. With the help of wheel 61 the desired stop height for molding body 27 is set. This setting is often carried out so that the molding body 27 is brought to zero level, i.e. barely in contact with the clamped piece of material. Preheating is now begun by blowing hot air or steam at atmospheric pressure into the heating chamber 1 through pipe stub 13 or 15. Hot air is preferably chosen for the treatment of synthetic material, and steam is preferably used in the treatment of wool. Molding body 27 has already been heated beforehand to a temperature corresponding to the desired material temperature, and the through-flow of heating medium continues during the whole of the molding process to keep molding body 27 at the desired temperature. At the termination of the preheating period, stop 59 is released so that molding body 27 move downwardly, solely under the influence of gravity, and quickly stretches the piece of material to the desired deformation. It will be noted that the falling weight of the molding body is carried solely by the piece of material. This falling weight can be varied with the help of weights 41 on plate 39, or alternatively weights on the counterweight holder 49, in case the desired falling weight is less than the total weight of molding body 27, rod 33 and plate 39. The deformation achieved is maintained during a post-heating period by allowing the molding body to remain hanging in the piece of material. Post-heating is also carried out by blowing hot air or steam into heating chamber 1, the temperature being kept the same as during preheating or preferably higher as described hereinabove. After the termination of the post-heating period, the molding body 27 is lifted with the help of lifting arm 55. Blowing-in of heating medium is simultaneously discontinued, and evacuation started through the exhaust connection 17. This will cause ambient air at room temperature to be sucked through the material into heating chamber 1, whereby the material will be quickly cooled. If desired, post-heating with a heating medium and renewed cooling can be carried out at this stage, the deformed piece of material first being blown to an upwardly curved form and thereafter resucked downwards so that it experiences a mechanical processing at the same time as temperature change.

By altering the falling weight and/or fall height, and with equipment which is otherwise the same, it is also possible to effect size variations, for example in clothing item parts produced by molding.

If molding body 27 is given a complicated configuration, supporting points or supporting rails can be arranged in heating chamber 1 corresponding to valleys or recesses in the molding body surface, which as a whole is convex. Such supplemental supports only support the material which should still freely hang so that deformation can be carried out as stretching and not as pressing between two complementary mold halves.

As an alternative to cooling with negative pressure in heating chamber 1, the material can be cooled by blowing cold air ito the heating chamber.

What we claim is:

1. A process for molding textile fabrics comprising
   a. preheating a fabric to the glass transition temperature of its component fibers;
   b. subjecting the fabric to sudden deformation by stretching at the glass transition temperature, substantially the entire deformation being carried out within five seconds; and
   c. post-heating the fabric without intermediate cooling to a temperature at least equal to the glass transition temperature while maintaining a constant deforming load on the fabric.

2. A process according to claim 1, where the pre-heating is carried out by treating the fabric with a gaseous medium at a temperature of at least 70° C.

3. A process according to claim 2, wherein the gaseous medium is steam at atmospheric pressure.

4. A process according to claim 1, wherein the pre-heating is carried out for 5 to 60 seconds.

5. A process according to claim 4, wherein the pre-heating is carried out for 10 to 30 seconds.

6. A process according to claim 1, wherein substantially the entire deformation is carried out in less than 1 second.

7. A process according to claim 1, wherein the post-heating is carried out at a temperature of between 60° to 200° C.

8. A process according to claim 7, wherein the post-heating is carried out at a temperature of between 90° to 150° C.

9. A process according to claim 1, wherein the post-heating is carried out for 5 to 60 seconds.

10. A process according to claim 9, wherein the post-heating is carried out for 10 to 40 seconds.

11. A process according to claim 1, wherein after post-heating and without further deformation, the fabric is quickly cooled to a temperature below the pre-heating temperature.

12. A process according to claim 11, wherein, after cooling, the fabric is subjected to repeated heating and subsequent cooling.

13. A process according to claim 12, wherein the reheating is carried out with steam substantially at atmospheric pressure and for up to 10 seconds.

14. A process according to claim 12, wherein the fabric is moveably suspended during reheating and subsequent cooling.

15. A process according to claim 1, wherein the fabric is clamped in frame means around the periphery of a surface area of the fabric to be molded, the fabric being freely suspended, the frame means being brought into cooperation with a pre-heated molding body after pre-heating of the fabric, for stretchingly deforming the fabric, the molding body being retained in its deforming position during substantially the entire post-heating period.

16. A process according to claim 15, wherein the fabric is selectively supported to produce irregularities in the surface shape thereof.

17. A process according to claim 16, wherein the molding body is separated from the fabric after the post-heating period, whereupon a cooling medium is caused to pass through the fabric.

18. A process according to claim 17, wherein the cooling medium is air at room temperature.

19. A process according to claim 17, wherein the cooling medium is caused to pass through the fabric for up to 15 seconds.

20. A process according to claim 19, wherein the cooling medium is caused to pass through the fabric for 5 to 10 seconds.

21. A process according to claim 11, wherein the fabric is arranged above a heat treatment chamber, and pre-heating and post-heating are carried out by blowing hot air or steam into the chamber, and cooling is carried out by connecting the chamber to a negative pressure source so that cool air is drawn into the chamber through the fabric.

* * * * *